(12) United States Patent
Muramatsu et al.

(10) Patent No.: US 6,477,391 B1
(45) Date of Patent: Nov. 5, 2002

(54) MOBILE TELEPHONE HOLDING DEVICE

(75) Inventors: Toshiro Muramatsu; Masao Sakata; Takashi Ueno; Masamitsu Furukawa; Masao Masumo; Yoshiaki Otake, all of Kanagawa-ken (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 09/437,093

(22) Filed: Nov. 9, 1999

(30) Foreign Application Priority Data

Nov. 10, 1998 (JP) .......................... 10-319454
Jul. 16, 1999 (JP) .......................... 11-203472

(51) Int. Cl.⁷ .............................................. H04Q 7/20
(52) U.S. Cl. .................... 455/550; 455/90; 455/557; 359/152
(58) Field of Search .................... 455/550, 90, 557, 455/569; 359/152, 172, 109, 158, 290, 531–533, 154, 174, 176, 113; 379/56.1–56.3; 340/825.69, 825.62, 825.72

(56) References Cited

U.S. PATENT DOCUMENTS

| | | | | |
|---|---|---|---|---|
| 5,510,924 A | * | 4/1996 | Terui et al. .................. | 359/143 |
| 5,636,264 A | * | 6/1997 | Sulavuori et al. ........... | 359/113 |
| 5,832,082 A | * | 11/1998 | Nagai ........................ | 379/449 |
| 5,850,189 A | * | 12/1998 | Sakanaka et al. ...... | 340/825.62 |
| 5,859,628 A | * | 1/1999 | Ross et al. .................. | 345/173 |
| 5,887,063 A | * | 3/1999 | Varadharajan et al. ........ | 380/21 |
| 5,949,149 A | * | 9/1999 | Shitanaka et al. .......... | 200/5 R |
| 5,999,294 A | * | 12/1999 | Petsko ........................ | 359/145 |
| 6,035,036 A | * | 3/2000 | Eisenbraun et al. ........ | 379/446 |
| 6,081,356 A | * | 6/2000 | Branc et al. ................. | 359/118 |
| 6,102,284 A | * | 8/2000 | Myers et al. ................ | 235/375 |
| 6,208,734 B1 | * | 3/2001 | Ortscheid et al. ........... | 379/446 |
| 6,262,824 B1 | * | 7/2001 | Sasaki et al. ............... | 359/163 |
| 6,266,542 B1 | * | 7/2001 | Stern et al. .................. | 455/567 |
| 6,298,047 B1 | * | 10/2001 | Steffes et al. ............... | 370/310 |
| 6,373,884 B1 | * | 4/2002 | Byrns ......................... | 370/465 |

* cited by examiner

Primary Examiner—Dwayne Bost
Assistant Examiner—Jean A Gelin
(74) Attorney, Agent, or Firm—McDermott, Will & Emery

(57) ABSTRACT

A mobile telephone holding device is provided for establishing a stable communication between a portable telephone and outside on-board instruments without adjusting the positions of respective infrared optical communication interfaces precisely. The holding device includes a light guide 3 disposed between a plane containing one surface of the portable telephone 5 equipped with an infrared optical communication interface 13 and one end face 19 opposing a housing 9 equipped with an IrDA element 27. The light guide 3 operates to direct an optical path of a light signal entering through one surface of the guide 3 to a direction of the other surface. The transmission and receiving of optical signals is accomplished between the telephone 5 and the instruments through the light guide 3.

12 Claims, 14 Drawing Sheets

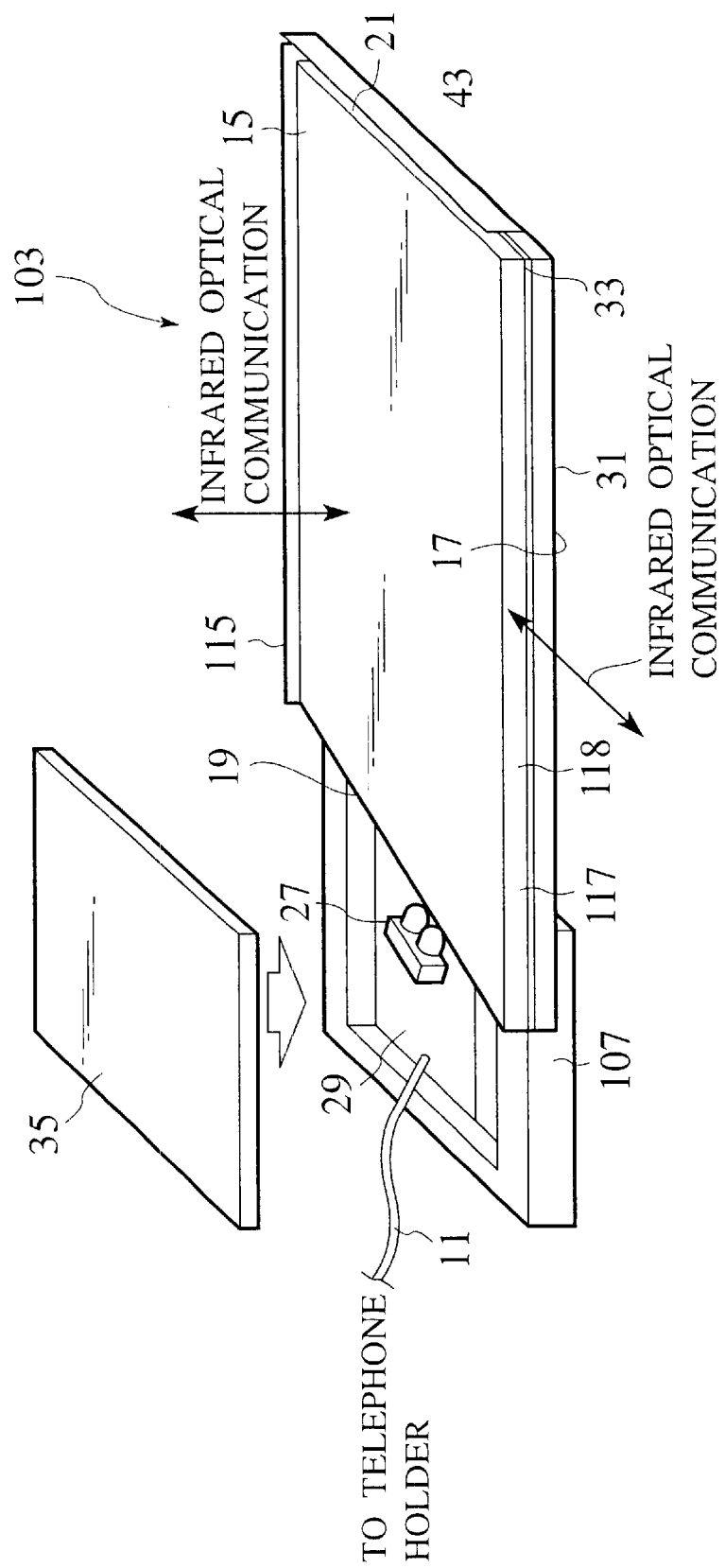

EXAMPLE OF SCATTERING PATTERN PART

EXAMPLE OF REFRACTION

EXAMPLE OF REFRACTION

EXAMPLE OF REFRACTION (COATING BY MATERIAL OF DIFFERENT REFRACTIVE INDEX)

EXAMPLE OF REFRACTION

MOBILE TELEPHONE HOLDING DEVICE

BACKGROUND OF THE INVENTION

1. Field of the Invention

The present invention relates to a mobile telephone holding device for holding a portable telephone having an infrared optical communication interface.

2. Description of the Related Art

As shown in FIG. 1, an earlier mobile telephone holding device (not prior art) comprises a telephone holder 555 for holding a portable telephone 551 thereon. The telephone holder 555 has a connector 557 connected to a connector 553 provided on the portable telephone 551. In the telephone holder 555, signals from the telephone 551 are distributed to respective signal lines, for example, a power line, an antenna cable, an aural signal line, etc. and finally connected to electronic instruments on a vehicle. For example, the aural signal line is connected to an audio unit of a "hands-free" apparatus in the vehicle. While, on the telephone holder 555, the portable telephone 551 is securely interposed between closing plate-shaped stays 557 slidably arranged on the holder 555.

Meanwhile, there is recently established IrDA (Infrared Data Communication Association) standard for carrying out a method of associating the portable telephone with the exterior instruments in a non-contact manner. Under such a situation, as shown in FIG. 2, a portable telephone 505 for adopting an infrared communication system is proposed (not prior art).

This portable telephone 505 is provided, on a lower side thereof, with an infrared communication interface 513. In case of holding such a portable telephone 505 on the telephone holder, it is also provided with another infrared communication interface for executing the infrared communication against the telephone 505, thereby effecting the association of the telephone 505 with the exterior "on-board" instruments in a non-contact manner.

In detail, as shown in FIG. 3, respective IrDA elements 527 used for this infrared communication interface each has a communication area 569 radiating within a range of approx. ±15 degrees to the front. Especially in case that one element 527 is distant from the other one as shown in the figure, it is necessary that the IrDA element 527 is contained in the communication area 569 of the mating IrDA element 527.

The above-mentioned holding devices have the following drawbacks.

First, in the mobile telephone holding device of FIG. 1, an user has to attach and detach the connector 557 to and from the portable telephone 551 every time he gets on and off the vehicle, being accompanied with a burdensome task. In addition, since the connector 557 itself is remarkably compact, there is a possibility of imperfect connection between the connectors 557, 553 due to their damage or deformation in handling the connector 557.

Next, in case of connecting the portable telephone 505 of FIG. 2 with the exterior "on-board" instruments in the non-contact manner, it is required to adjust the positions of the elements 527 so that the light-receiving area of each light-receiving (incident) element 565 contains a light-emitting element of the mating IrDA element 527 as shown in FIG. 3.

Therefore, as shown in FIG. 4, there is a possibility that, under a condition that the IrDA elements 527 are close to each other, a light-receiving area 567L of the incident element 565L of the left IrDA element 527L does not overlap with a light-emitting area 563R of the light-emitting element 561R of the right IrDA element 527R perfectly. Consequently, there is caused a problem of impossibility in the infrared communication despite that an off-set distance T (FIG. 4) between the respective centers of both IrDA elements 527L, 527R is smaller than the off-set distance S (FIG. 3) between the respective centers of both IrDA elements 527, 527 (S>T).

Further, in case that the positions of the IrDA elements are different for every types of portable telephones, then it is necessary to alter the position of the IrDA element on the telephone holder in accordance with the sort of portable telephone, inducing the deteriorated operability.

Additionally, it should be noted that the IrDA element on the telephone holder's side directs to the inside of the telephone holder in view of the requirement of non-contact communication with the portable telephone. Therefore, there is a problem of impossible communication between the portable telephone being accommodated in the "on-board" telephone holder and a portable communication tool, such as PDA (Personal Digital Assistants) each having an infrared optical communication interface, a "notebook" type personal computer, etc.

SUMMARY OF THE INVENTION

Under such a circumstance, it is an object of the present invention to provide a mobile telephone holding device which is capable of establishing a stable communication between a portable telephone and electronic instruments and also between the telephone and a portable communication tool without adjusting the positions of respective infrared optical communication interfaces precisely.

According to the invention, the above-mentioned object is accomplished by a mobile telephone holding device for detachably holding a portable telephone and transferring optical signals between a first infrared optical communication interface arranged on a surface of the portable telephone and a second infrared optical communication interface connected to electronic instruments, the mobile telephone holding device comprising:

an optical path changing member disposed between a plane containing the surface of the portable telephone having the first infrared optical communication interface thereon and another plane containing the second infrared optical communication interface, for changing a direction of an optical path of the optical signal entering through one of the planes to a direction toward the other plane.

With the above-mentioned arrangement, owing to the provision of the optical path changing member, the simple operation to abut the first infrared optical communication interface arranged on the portable telephone on a surface of the optical path changing member allows to carry out the transmitting/receiving of optical signal between the portable telephone and electronic instruments through the optical path changing member.

The above and other features and advantages of this invention will become apparent, and the invention itself will best be understood, from a study of the following description and appended claims, with reference to the attached drawings showing one preferred embodiment of the invention.

BRIEF DESCRIPTION OF THE DRAWINGS

FIG. 12 is a partial exploded perspective view of an essential part of the mobile telephone holding device of the third embodiment;

DESCRIPTION OF THE PREFERRED EMBODIMENT

Referring to the attached drawings, we now describe various embodiments of the present invention.

[1st. Embodiment]

Figure 1:
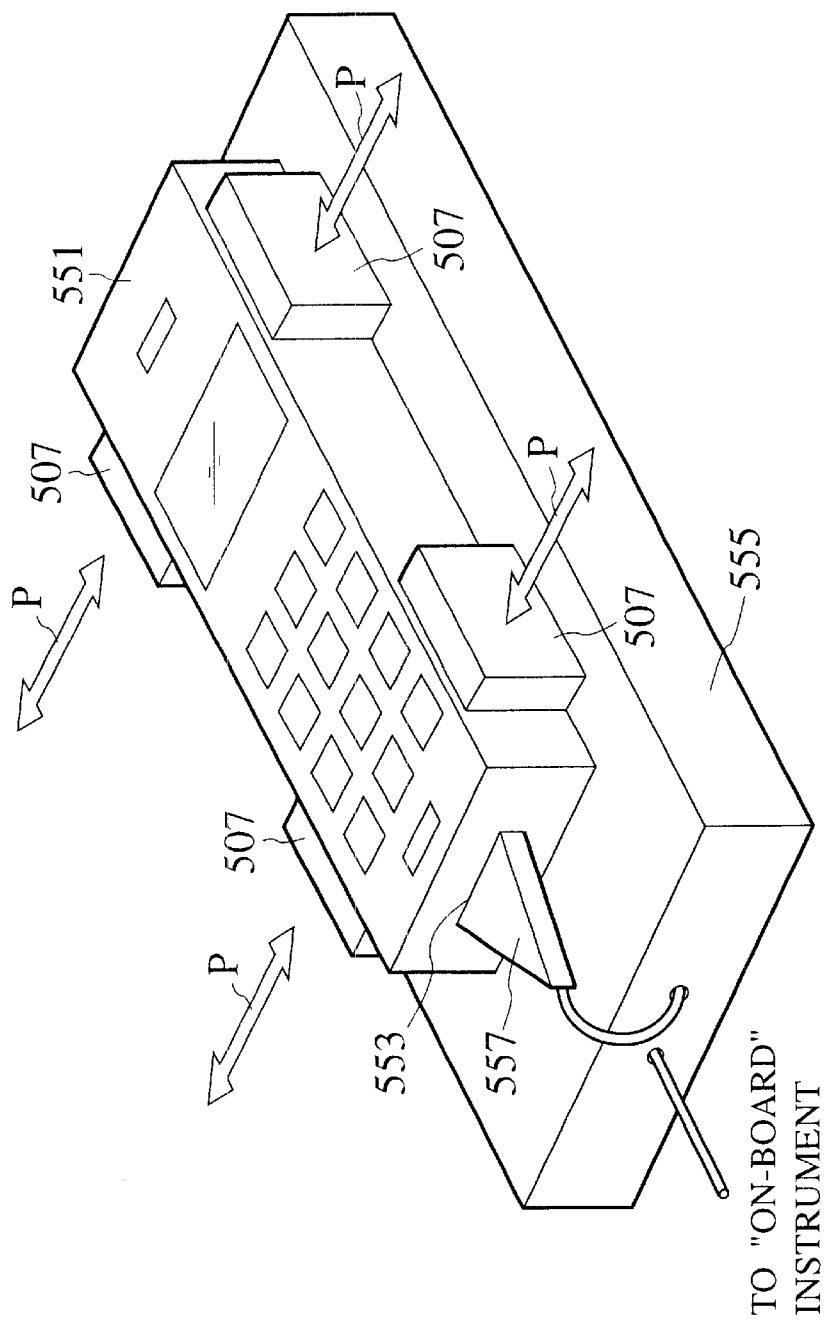
FIG. 1 is a perspective view of an earlier art mobile telephone holding device.
Figure 2:
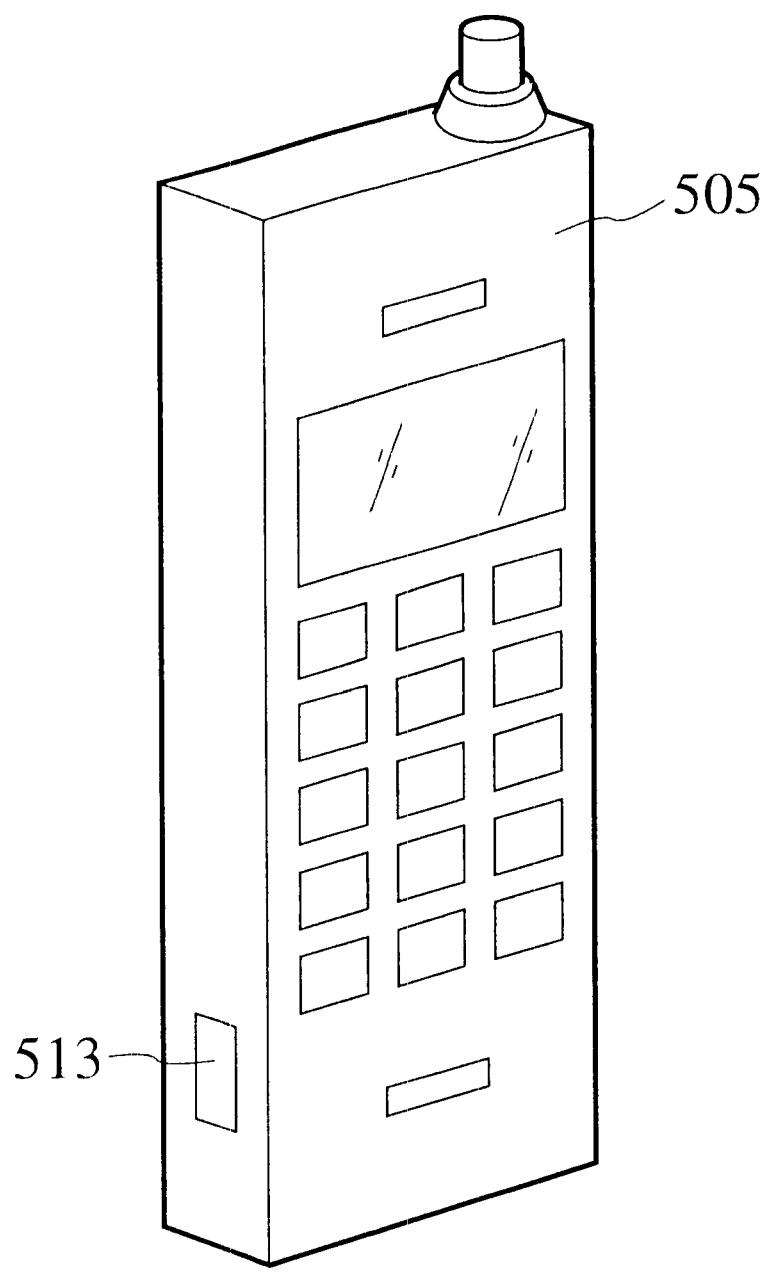
FIG. 2 is a perspective view of a portable telephone having an infrared optical communication interface.
Figure 3:
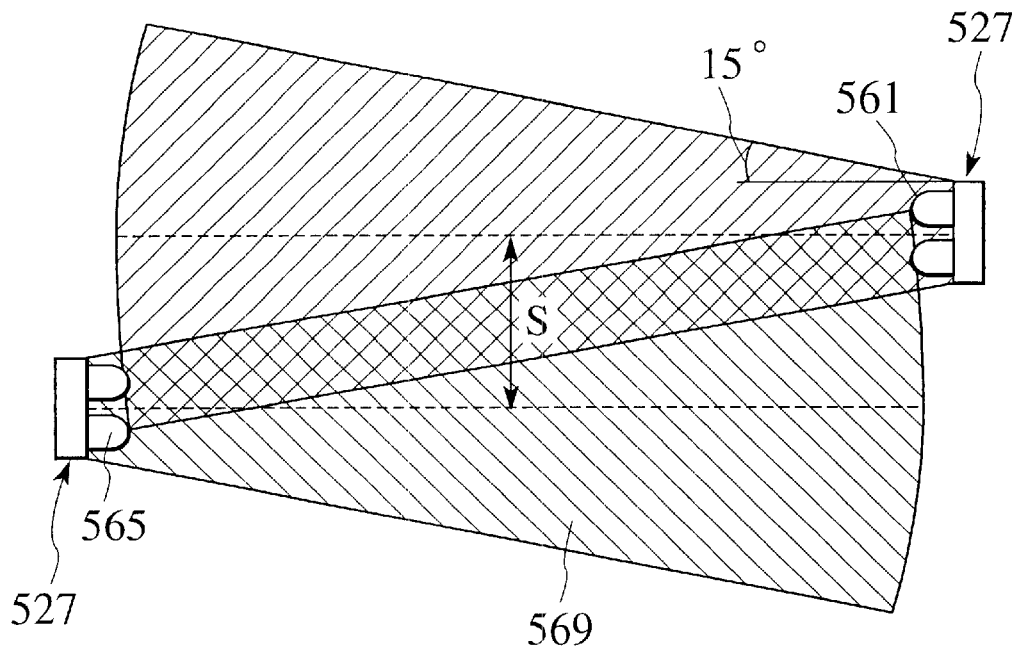
FIG. 3 is an explanatory diagram for infrared optical communication under condition that IrDA elements are separated from each other in the earlier art.
Figure 4:
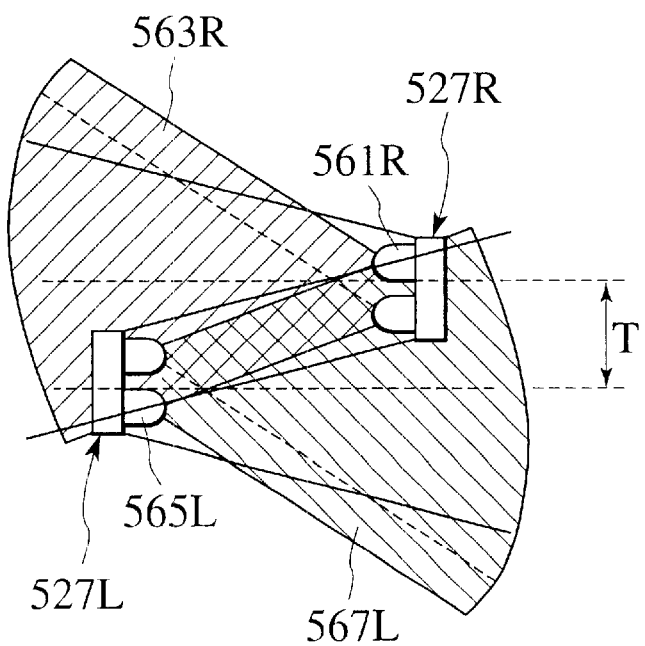
FIG. 4 is an explanatory diagram for infrared optical communication under condition that the IrDA elements are close to each other in the earlier art.
Figure 5:
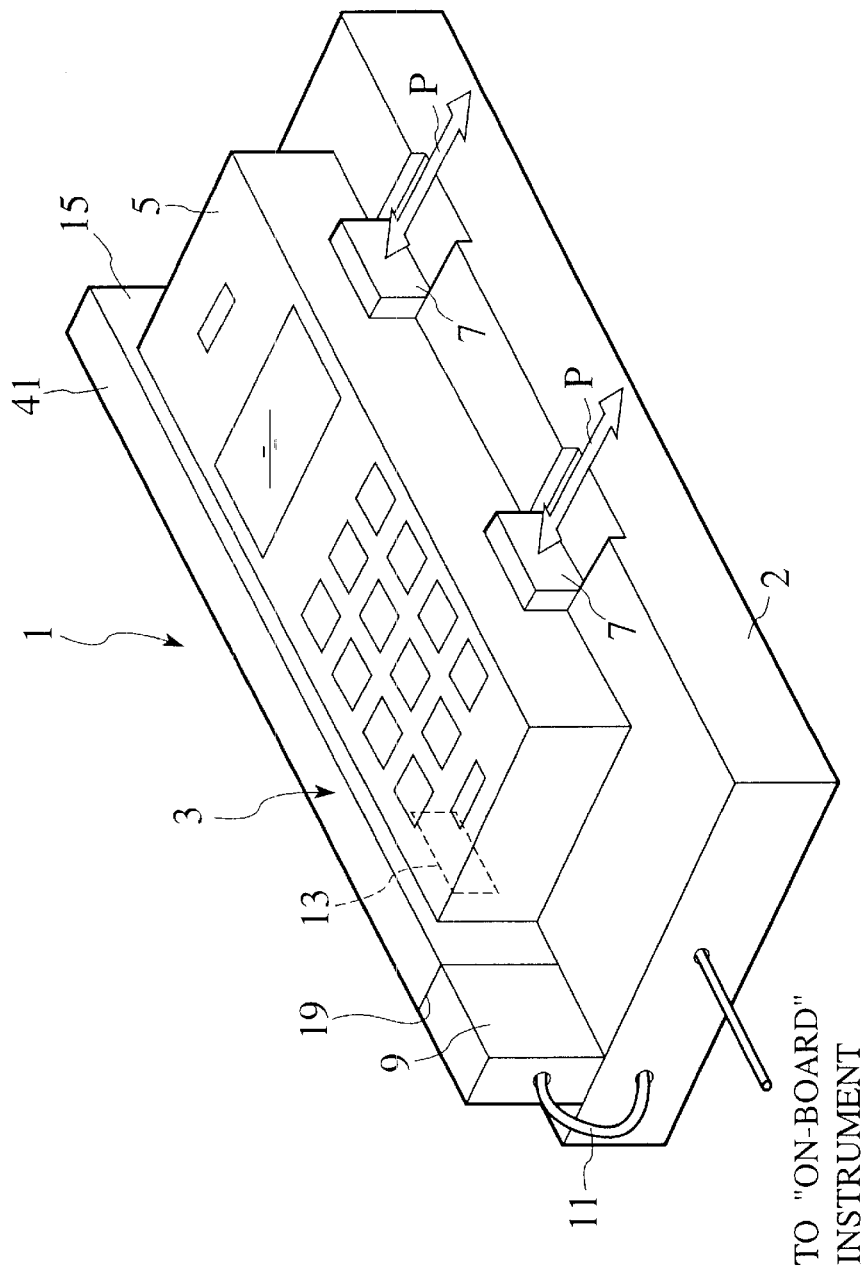
FIG. 5 is a perspective view of a mobile telephone holding device in accordance with a first embodiment of the present invention.

FIG. 5 shows a telephone holder 1 which is applicable to a mobile telephone holding device in accordance with the first. embodiment of the present invention.

In a center console of the vehicle, the telephone holder 1 is arranged for holding and accommodating a portable telephone 5 therein. This telephone holder 1 is constructed so that an user can attach the portable telephone 5 thereto and also detach it therefrom every time the user gets in and off the vehicle.

In a pedestal 2, the telephone holder 1 includes a light guide 3, a pair of stays 7 and a housing 9. The light guide 3 is secured on the pedestal 2 and constructed so as to juxtapose the box-shaped portable telephone 5 laterally. The stays 7 are slidably arranged on the pedestal 2 at a distance. Having a predetermined frictional coefficient against the pedestal 2, each of the stay 7 is carried so as to slide on the pedestal 2 in the direction of arrow P by an artificial operative force.

In case of holding the portable telephone 5 in the telephone holder 1, the stays 7 are slid toward the light guide 3 to close a space between the stays 7 and the light guide 3 for pinch the portable telephone 5 therebetween. Conversely, when detaching the telephone 5 from the telephone holder 1, the stays 7 are shifted apart from the light guide 3 to open a space between the stays 7 and the light guide 3 for releasing the portable telephone 5 from the holder 1. The portable telephone 5 is provided, on a lower side face thereof, with an infrared optical communication interface 13.

The light guide 6 in the form of a hexahedral box is provided, adjacent to an end face 19 thereof, with a housing 9. In the housing 9, an IrDA element 27 (FIG. 6) and the surrounding circuit mentioned later are arranged and connected to an electronic circuit through a signal line 11.

The infrared optical communication interface 13 on the side face of the portable telephone 5 is arranged so as to oppose the light guide 3. A surface 15 of the light guide 3 is established to be equal to or larger than an area of the side face of the portable telephone 5.

The outer profile of the light guide 3 and the housing 9 will be described with reference to FIG. 6. Note, this figure shows the light guide 3 and the housing 9 of FIG. 5 laying themselves down.

For example, the light guide 3 is made of a transparent acrylic material or the like. Any other materials may be employed for the guide 3 if only allowing the infrared light to penetrate therethrough. The light guide 3 has the above surface 15 for contact with the side face of the portable telephone 5, a back surface 17 opposing the surface 15, the above end face 19 having the housing 9 attached thereon, an end face 21 opposing the end face 19, a side face 23 for contact with the pedestal 2 and another side face 25 opposing the side face 23. Note, in FIG. 6, an upward direction with respect to the surface 15 corresponds to a direction of the infrared optical communication since the surface 15 opposes the portable telephone 5.

Figure 6:
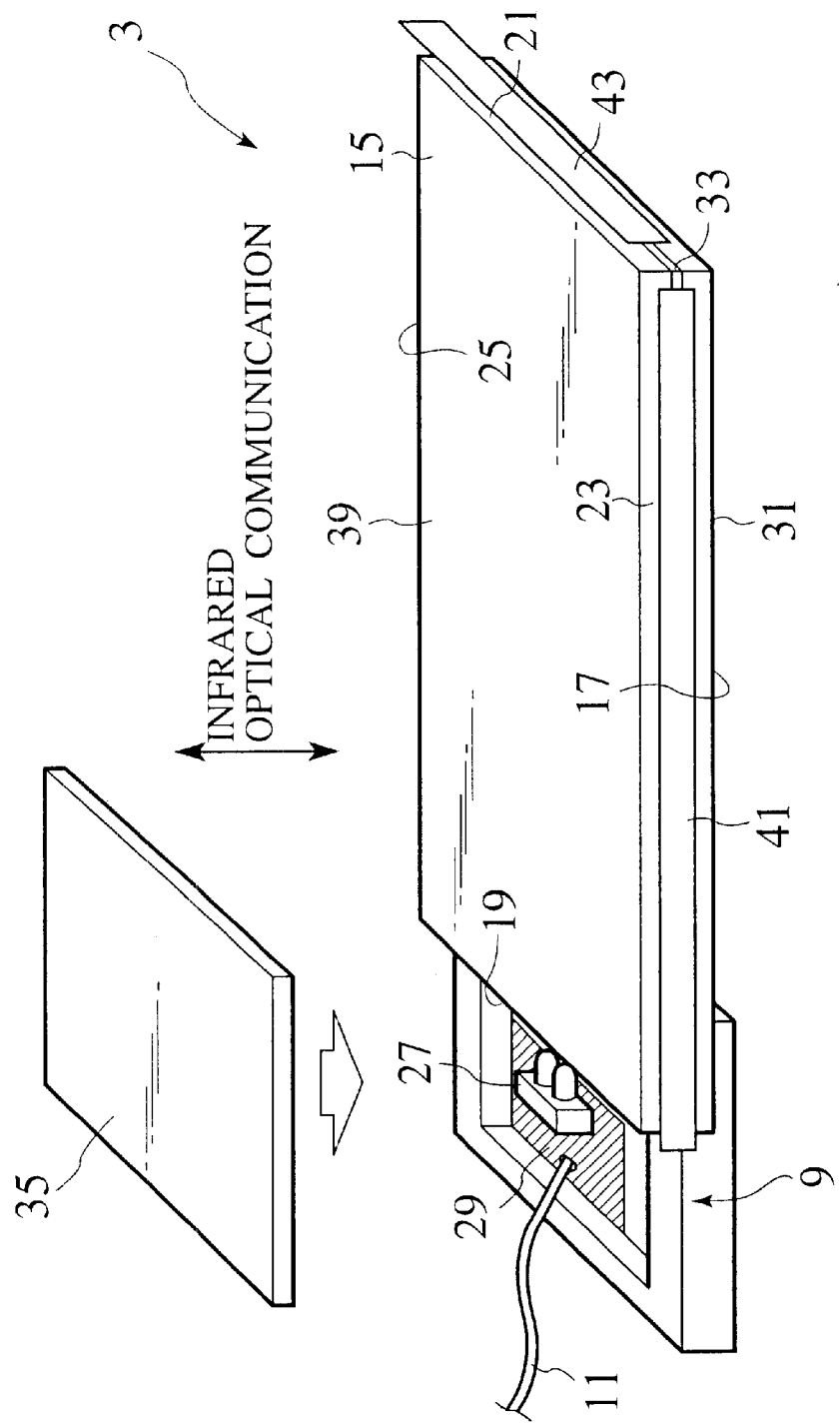
FIG. 6 is a partial exploded perspective view of an essential part of the mobile telephone holding device of the embodiment.

As shown in FIG. 6, the IrDA element 27 is arranged Inside the housing 9, being made of a shield material for protecting the element 27 from external optical noises. The IrDA element 27 in which an infrared light emitting part, its drive circuit, an infrared light receiving part and its preamplifier are integrated is fixed on a circuit board 29. The signal line 11 is drawn out from the surrounding circuit provided on the circuit board 29.

The IrDA element 27 is orientated on the circuit board 29 so as to both emit the infrared light into the light guide 3 through the end face 19 and receive the infrared light coming from the interior of the light guide 3 through the end face 19. The housing 9 is provided with a lid 35 for covering and shielding the circuit board 29.

Stuck on the whole back surface 17 opposing the surface 15 of the light guide 3 (i.e. the surface on the opposite side of the portable telephone 5) is a reflector 31 which will be described later.

Figure 7:
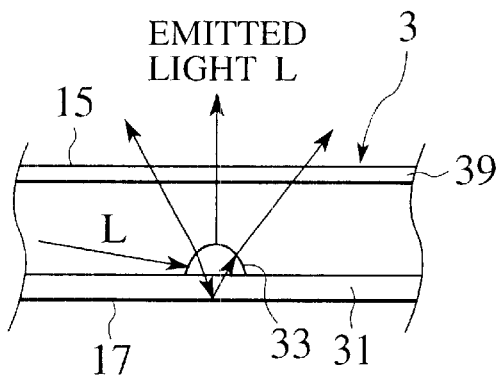
FIG. 7 is a view of another essential part of the mobile telephone holding device, showing the constitution on optical characteristic and optical paths.

On the back surface 17 for contact with the reflector 31, a scattering pattern part 33 is formed, as shown in FIG. 7. For example, the scattering pattern part 33 is provided by spreading generally hemisphere-shaped minute projections over the whole back surface 17 of the light guide 3.

As shown in FIG. 7, the infrared light L irradiated by the hemisphere-shaped projection is scattered about a wide range of the light guide 3. Additionally, the infrared light L penetrating the hemisphere-shaped projection is refracted in the cavity and reflected by the reflector 31. Consequently, penetrating through the hemisphere-shaped projection again, this reflected light L is also scattered about a wide range of the light guide 3.

While, a cushion member 39 is pasted on the surface 15 of the light guide 3. The cushion member 39 is made of a soft buffer material which is transparent to the infrared light, for example, resinous material such as vinyl resin. In the use of the light guide 3 while sticking to the portable telephone 15, the cushion member 39 serves to prevent the surface of the light guide 3 and the side face of the telephone 5 from being damaged.

Figure 8:
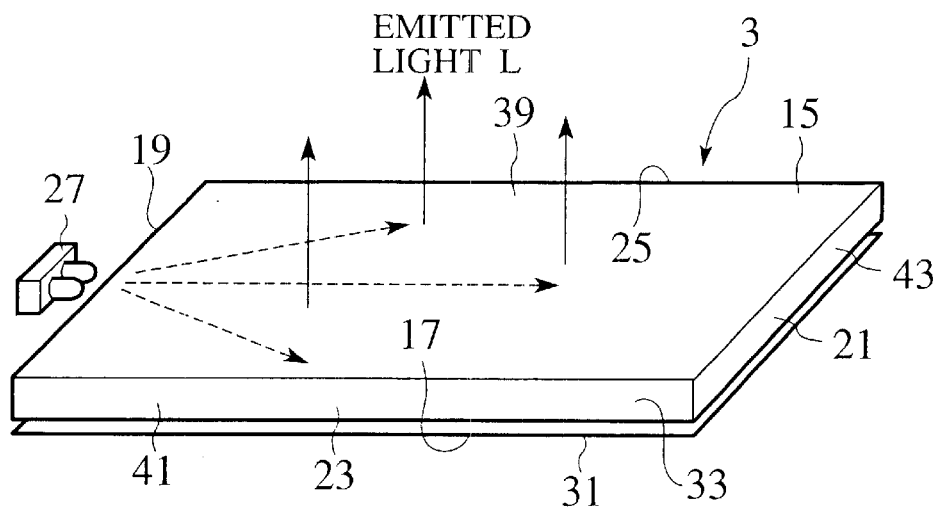
FIG. 8 is a perspective view of the essential part of the mobile telephone holding device, showing the constitution on optical characteristic.
Figure 9:
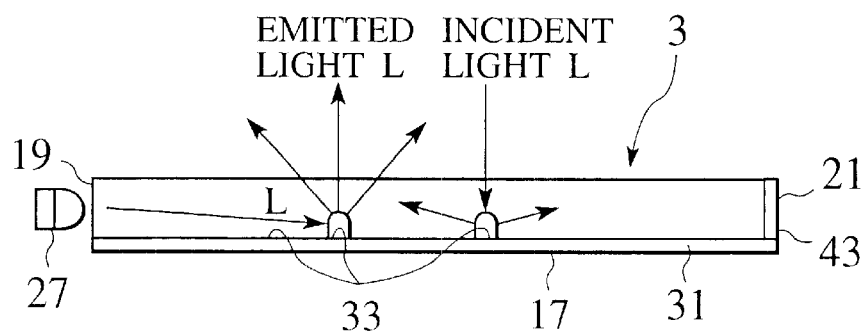
FIG. 9 is a view for explanation of the optical paths in the essential part of the mobile telephone holding device.

Also, a reflector 43 is adhesively attached to the end face 21 opposing the end face 19 of the light guide 9 for mounting the housing 9 thereon, as shown in FIGS. 8 and 9. The reflector 43 serves to both return the infrared light, which has been traveling in the light guide 3, to the interior of the light guide 3 without leaking out of the end face 21 and block off the incident light as noise from the outside.

Similarly, a reflector 41 is adhesively attached to the end face 25 opposing the end face 23 of the light guide 9, too. The reflector 41 also serves to return the infrared light, which has been traveling in the light guide 3, to the interior of the light guide 3 without leaking out of the end face 25 and block off the incident light as noise from the outside. Note, the above-mentioned reflectors 31, 41, 43 etc. may be constituted by the above-mentioned and hemisphere-shaped scattering body.

The light guide 3 is identical to an optical path changing member which directs an optical path of the infrared light entering through the surface 19 to a direction for the surface 15 and which directs an optical path of the infrared light entering through the surface 15 to a direction for the surface 19 conversely. In detail, the light guide 3 allows the infrared light, which has entered into the guide 3 through the surface 19, to be scattered or reflected by the scattering pattern part 33 on the back surface 17 thereby to emit the infrared light from the substantially-whole area of the surface 15. Conversely, the light guide 3 also allows the infrared light, which has entered into the guide 3 through the surface 15, to be scattered or reflected thereby to emit the infrared light from the surface 19.

Next, referring to FIG. 5, the operation of the above-mentioned telephone holder 1 will be described.

In FIG. 5, it is assumed that the light guide 3 is arranged on the pedestal 2 in a manner that the surface 15 faces the side of the portable telephone 5 while the infrared optical communication interface 13 on the side face of the telephone 5 opposes the surface 15 of the light guide 3.

Through the signal line 11, the IrDA element 27 in the housing 9 is connected from the circuit board 29 to a connection circuit in the telephone holder 1 and finally connected to a speaker and a microphone for the handsfree system, a navigation system and an "on-board" information instrument, such as an "on-board" personal computer.

The portable telephone 5 is urged against the light guide 3 by the stays 7 closing in the direction of arrows P and securely pinched between the light guide 3 and the stays 7. Together with the IrDA element 27 in the telephone holder 27, the infrared optical communication interface 13 of the portable telephone 5 carries out the infrared optical communication in accordance with the IrDA standard.

With reference to FIGS. 7 to 9, we now describe the transmitting operation of the infrared light by the light guide 3.

The infrared light L, which has been emitted from the infrared light emitting part of the IrDA element 27 connected to the "on-board" information instruments, enters into the light guide 3 through the end face 19 and is propagated in the light guide 3. Since the infrared light L has the diffusibility to some degree, the infrared light L is partially irradiated on the scattering pattern part 33 on the side of back surface 17 of the light guide 3. Although a part of the infrared light L penetrates the back surface 17 of the light guide 3 for scattering, it is reflected by the reflector 31 on the back face 17 and enters into the light guide 3 again.

Further, a part of the infrared light L emitted from the IrDA element 27 travels straight in the light guide 3 to reach the opposite end face 21. Thereafter, being reflected by the reflector 43 on the end face 21, the infrared light is again introduced into the light guide 3 and irradiated on the scattering pattern part 33 on the back surface 17.

As to the infrared light reaching the side face 23 of the light guide 3, the light is similarly reflected by the reflector 41 on the side face 23 and again introduced into the light guide 3 for irradiation on the scattering pattern part 33 on the back surface 17.

In this way, the infrared light L emitted from the IrDA element 27 is generated from the substantial whole of the surface 15 of the light guide 3 upward in the vertical direction.

On the contrary, the infrared light L, which has been emitted from the IrDA element on the portable telephone 3 and sequentially penetrates the surface 15 of the light guide 3, traces the optical paths in the reverse order and is generated to the outside through the end face 19 and received by a receiving part of the IrDA element 27.

Thus, the present invention allows the user to carry out the hands-free call using the portable telephone 5 and the data communication upon connecting the "on-board" information instrument with a portable telephone circuit network.

In this way, according to the embodiment, there is no need to oppose the infrared optical communication interface 13 of the portable telephone 5 to the IrDA element 27 on the side of the telephone holder 1 precisely and therefore, the user has only to oppose the interface 13 of the portable telephone 5 against the light guide 3 of the holder 1 in his simple positioning, whereby the operability of the device can be remarkably improved.

Further, since the surface 15 of the light guide 3 adheres to the infrared optical communication interface 13 of the portable telephone 5, there is no possibility of impurities' invasion into the infrared optical paths, completing the infrared optical communication in proper.

[2nd. Embodiment]

Figure 10:
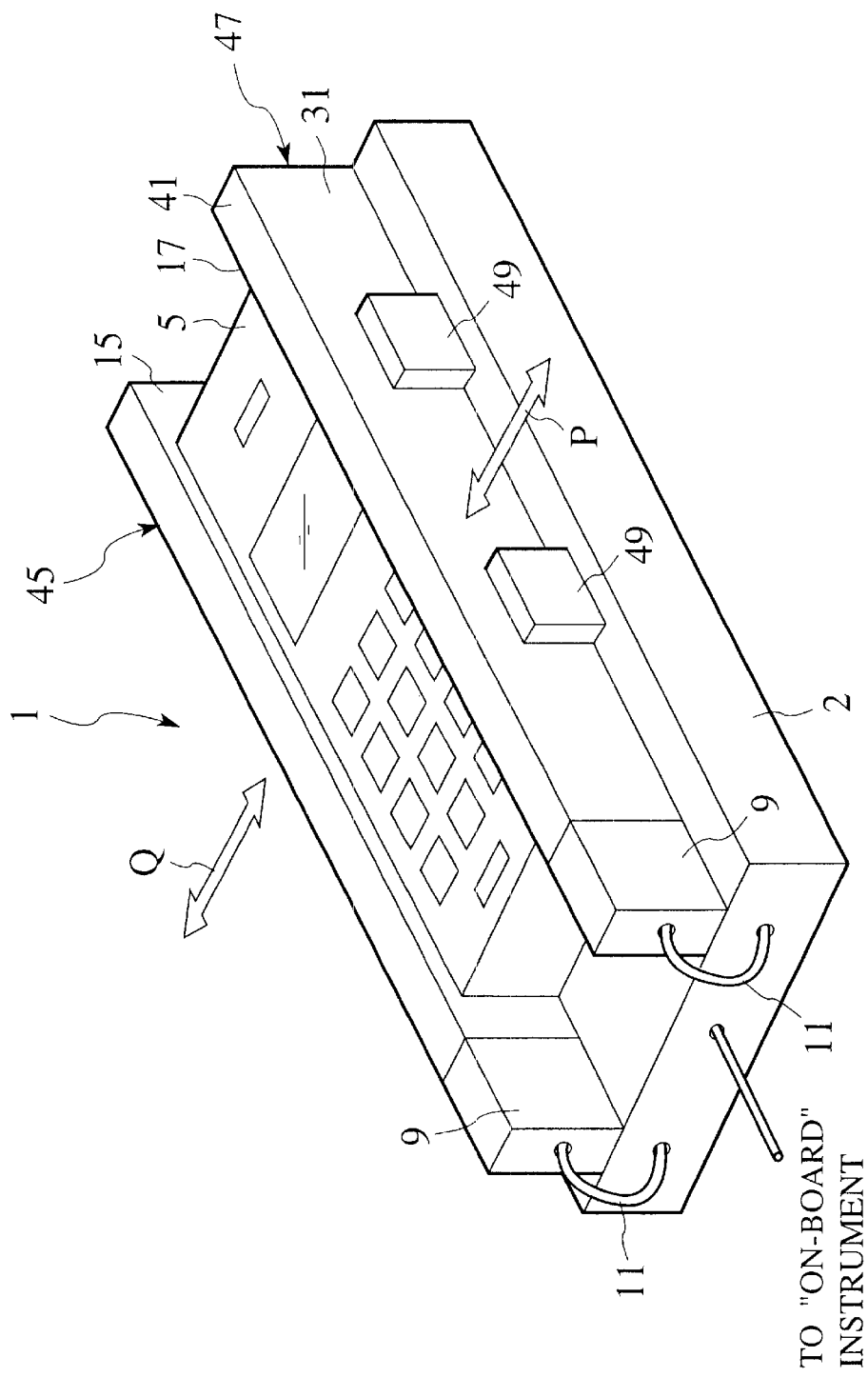
FIG. 10 is a perspective view of the mobile telephone holding device in accordance with a second embodiment of the present invention.

FIG. 10 shows the telephone holder 1 applicable to the mobile telephone holding device in accordance with the second embodiment of the invention.

In accordance with the second embodiment, a pair of light guides 3 each having the housing 9 of the first embodiment are juxtaposed at a distance on the pedestal 2, in parallel with each other. Note, in this embodiment, these light guides will be referred to "a first light guide 45 and a second light guide 47", hereinafter. Outside each of the light guides 45, 47, a pair of stays 49 are slidably arranged on the pedestal 2.

On the pedestal 2, the portable telephone 5 is interposed between the first light guide 45 and the second light guide 47. Since the first light guide 45 and the second light guide 47 together with the stays 49 are slid close to or apart from each other in the directions of arrows P and Q in opposition to the frictional resistance, the portable telephone 5 can be pinched between the light guide 45 and the light guide 47.

In this embodiment, the infrared optical communication is carried out between the infrared optical communication interface 13 of the portable telephone 5 and either one of the surface 15 of the first light guide 45 and the back surface 17 of the second light guide 47, as similar to the first embodiment.

As a result, there can be realized an infrared optical communication over the substantial whole of either the surface 15 of the light guide 45 or the back surface 17 of the light guide 47. Additionally, there is no need to position the IrDA elements so as to oppose each other while the portable telephone 5 can be retained in the holder 1 securely.

Further, irrespective of the position of the infrared optical communication interface 13 on either side of the portable telephone 5, the infrared optical communication can be accomplished, whereby the user can put the portable telephone 5 on the pedestal 2 without worrying about the direction of the portable telephone 5.

[3rd. Embodiment]

Figure 11:
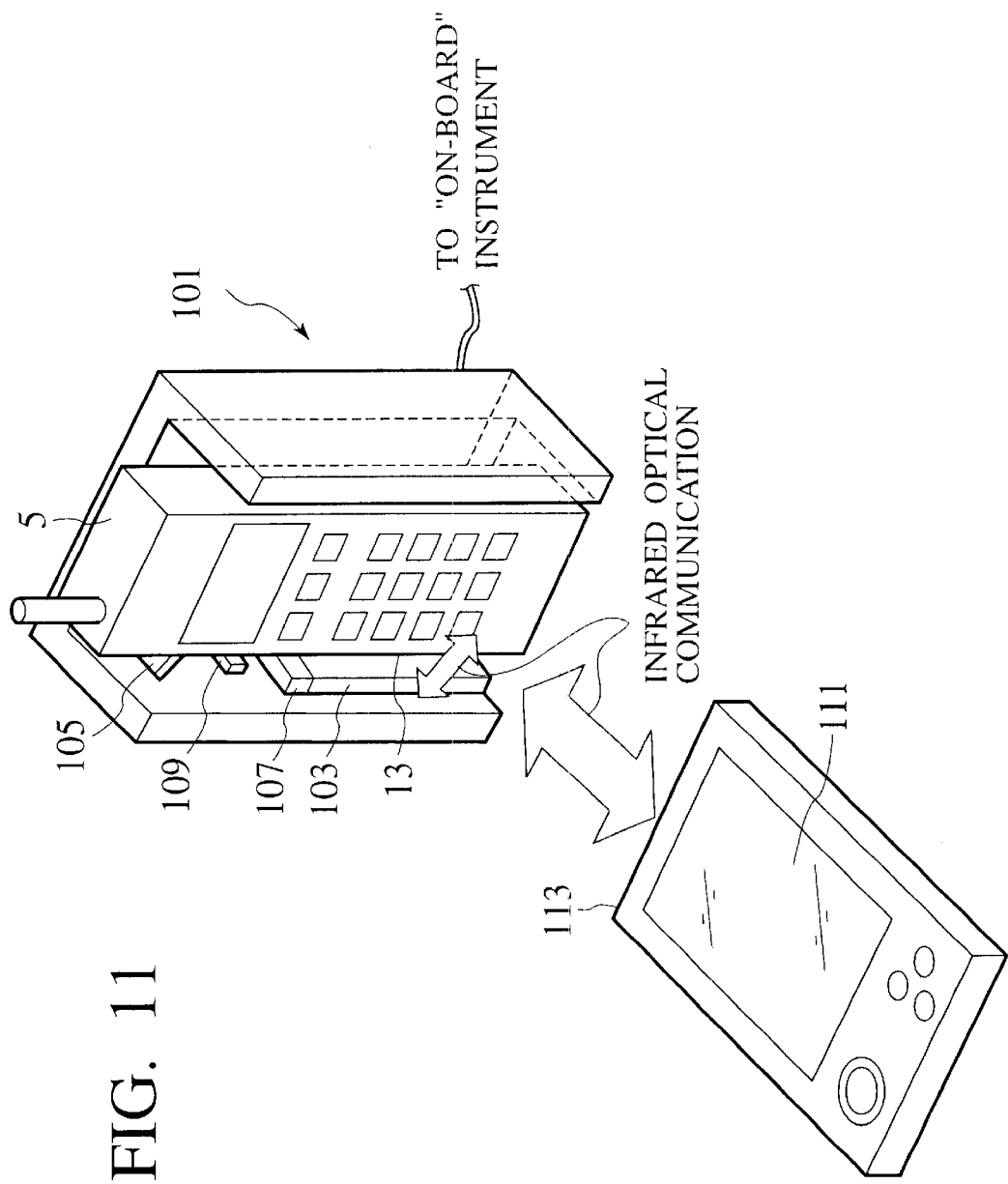
FIG. 11 is a structure view of a telephone holder applicable to the mobile telephone holding device in accordance with a third embodiment of the present invention.

FIG. 11 shows a telephone holder 101 applicable to the mobile telephone holding device in accordance with the third embodiment of the invention.

In an instrumental panel of the vehicle, the telephone holder 101 is arranged for holding and accommodating the portable telephone 5 therein. This telephone holder 5 is also constructed so that the user can attach the portable telephone 5 thereto and also detach it therefrom every time the user gets in and off the vehicle.

The telephone holder 101 is equipped with a light guide 103, a pair of stays 105 (only one shown), the housing 107 and the telephone-detecting part 109.

The light guide 103 is fixed on an inner side of the recessed telephone holder 101 so that the box-shaped portable telephone 5 is juxtaposed with the lateral side of the light guide 103. The stays 105 are fixed on the inner side faces of the recessed telephone holder 101. Thus, when the portable telephone 5 is inserted into the telephone holder 101 from the upside to the downside in the figure, the stay 105 comes into touch with the side faces of the portable telephone 5, so that the attachment of the portable telephone 5 can be detected by the telephone-detecting part 109 in contact with a free end of one stay 105.

The light guide 103 in the form of a hexahedral box is provided, adjacent to an end face thereof, with the housing 107. In the housing 107, an IrDA element and the surrounding circuit mentioned later are arranged and connected to an electronic circuit in the telephone holder 101 through the signal line 11.

The infrared optical communication interface 13 on the side face of the portable telephone 5 is arranged so as to oppose the light guide 103.

The telephone-detecting part 109 serves to detect the portable telephone 5 being fixed in the telephone holder 101.

A portable information instrument 111 is provided, on a front side thereof, with an infrared optical communication interface 113 capable of the infrared optical communication with the interface 13 of the portable telephone 5 through the light guide 103. Additionally, the instrument 111 is also capable of the infrared optical communication with the "on-board" instruments through the interface 113, the light guide 103 and the later-mentioned IrDA element in order. Note, for example, the PDA and the note-sized personal computer both having the infrared optical communication interfaces, etc. may be employed as the portable information instrument 111.

Next, the outer profile of the light guide 103 and the structure of the housing 107 will be described with reference to FIG. 12. Note, the light guide 103 and the housing 107 of the embodiment are similar to those in FIG. 6 in terms of the constitution. Therefore, the elements similar to those in FIG. 6 are indicated with the same reference numerals respectively and their descriptions are eliminated.

According to the embodiment, one end face 19 of the light guide 103 is slanted to the longitudinal direction of the guide 103 and subjected to an appropriate surface treatment. By arranging the IrDA element 27 vertically to the end face 19, the embodiment is directed to increase the amount of light signals transmitted in the light guide 103 to reach a front surface 118 thereby performing the effective transmitting/receiving of optical signals.

Both of arrows in FIG. 12 designate respective directions along which the infrared optical communication is carried out.

The reflector 31 is disposed on the back face 17 opposing to the face of the light guide 103 executing the infrared optical communication with the portable telephone 5, for interrupting the entering of light as noise from the outside without leaking the infrared light scattering in the light guide 103.

While, the reflector 43 is disposed on the other end face 21 opposing to the end face 19 on which the IrDA element 27 is arranged, for reflecting the infrared light traveling in the light guide 103 on the face 21 without leaking out and interrupting the entering of light as noise from the outside. Note, in the modification, the reflector 43 may be replaced with a scattering body mentioned later.

A reflector 115 is disposed on an end face opposing to the face of the light guide 103 executing the infrared optical communication with the portable information instrument 111, for reflecting the infrared light traveling in the light guide 103 on the above end face without leaking out and interrupting the entering of light as noise from the outside. Note, in the modification, the reflector 115 may be replaced with the scattering body mentioned later.

The scattering pattern part 33 is arranged on the back surface 17 of the light guide 103, for transmitting the scattering infrared light in the light guide 103 through the end face and also introducing the outside infrared light for the infrared optical communication into the light guide 103.

A refracting pattern part 117 is arranged on a front surface 118 of the light guide 103, for refracting the scattering infrared light in the light guide 103 thereby to transmit the light through the surface 118 and also introducing the outside infrared light for the infrared optical communication into the light guide 103.

With reference to FIGS. 11 to 17, we now describe the operation of the telephone holder 101 which is applicable to the mobile telephone holding device.

In an instrument panel of the vehicle, the telephone holder 101 is arranged for holding and accommodating the portable telephone 5 therein. This telephone holder 101 is also constructed so that the user can attach the portable telephone 5 thereto every time the user gets in the vehicle.

Figure 16A:
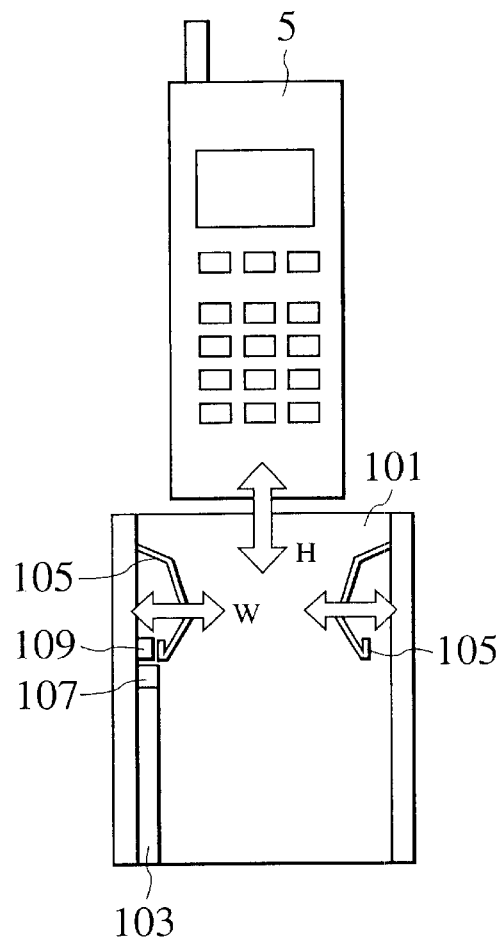
FIG. 16A is a front view of the mobile telephone holding device of the third embodiment, showing a state before inserting the portable telephone into the telephone holder.
Figure 16B:
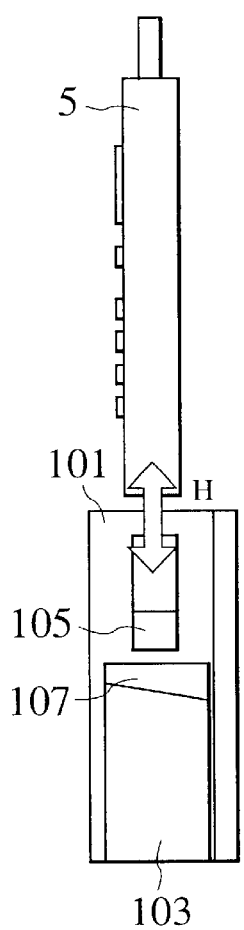
FIG. 16B is a side view of the mobile telephone holding device of the third embodiment, showing the state before inserting the portable telephone into the telephone holder.
Figure 17:
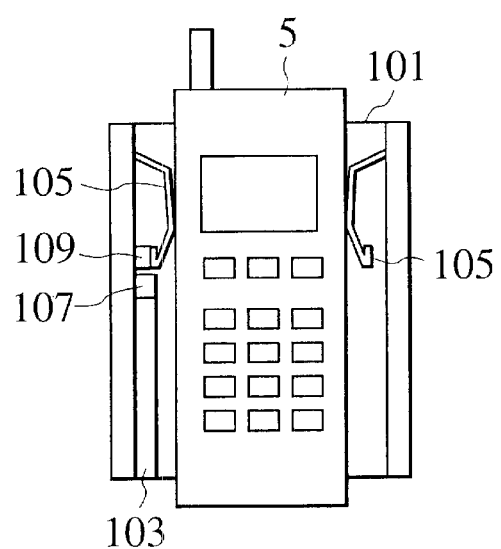
FIG. 17 is a front view of the mobile telephone holding device of the third embodiment, showing a state after inserting the portable telephone into the telephone holder.

Being inserted in the direction of arrow H as shown in FIGS. 16A and 16B, the portable telephone 5 is interposed between the stays 105, 105 deflecting in the direction of arrow W and fixed in the telephone holder 101 as shown in FIG. 17.

The light guide 103 is arranged in the telephone holder 101 so that the surface 15 for the infrared optical communication can oppose the portable telephone 5. While, the portable telephone 5 is arranged on the telephone holder 101 so that the infrared optical communication interface 13 on the side of the telephone 5 opposes the light guide 103. Additionally, the light guide 103 is arranged in the telephone holder 103 so as to direct the front face 118 for the infrared optical communication to a cabin of the vehicle.

The portable information instrument 111 is used in a position allowing the infrared optical communication interface 113 to oppose the front face 118 of the light guide 103.

When it is detected by the telephone-detecting part 109 that the telephone 5 is fixed on the telephone holder 101, a connection circuit in the telephone holder 101 is activated by the detecting part 109 through a signal line (not shown), thereby initiating the transmitting/receiving of optical signals between the IrDA element 27 and either the infrared optical communication interface 13 of the telephone 5 or the portable information instrument 111.

With reference to FIGS. 13A to 14C, we now describe the transmitting operation of the infrared light at the light guide 103.

Figure 13A:
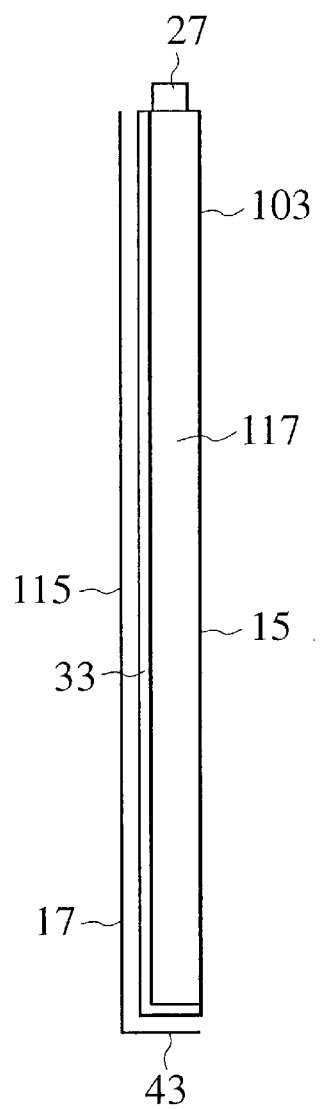
FIG. 13A is a front sectional view of the essential part of the mobile telephone holding device of the third embodiment.
Figure 13B:
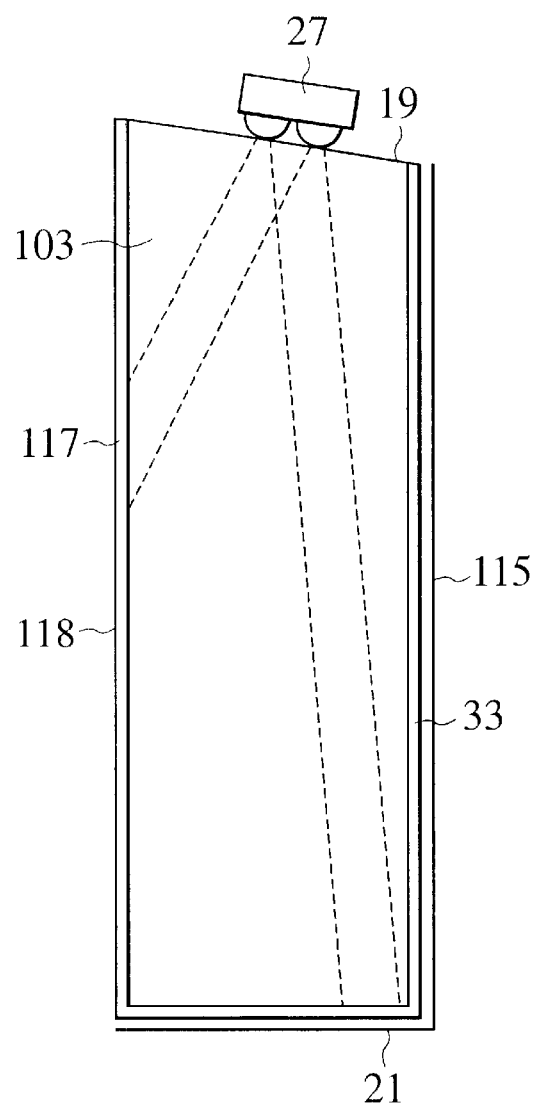
FIG. 13B is a side view of the essential part of the mobile telephone holding device of the third embodiment.
Figure 13C:
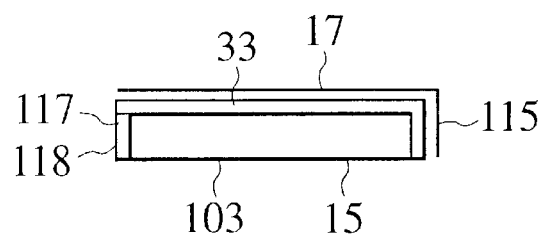
FIG. 13C is a plane view of the essential part of the mobile telephone holding device of the third embodiment.
Figure 14A:
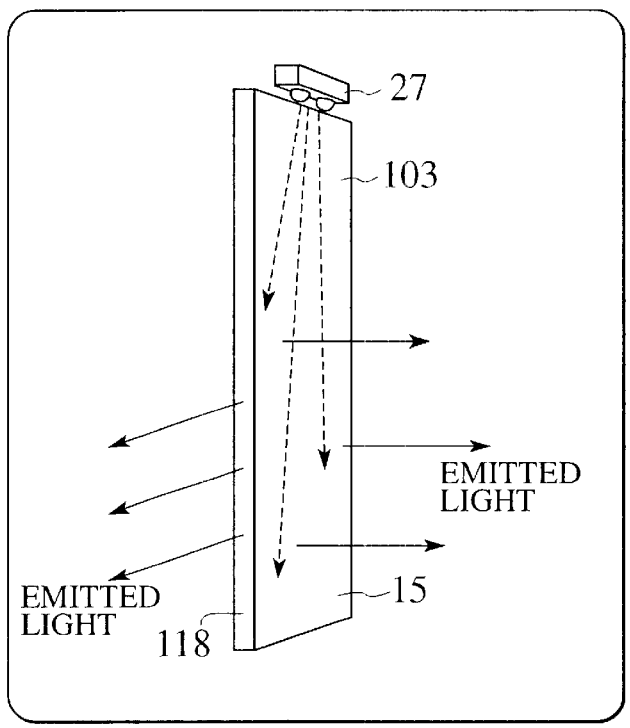
FIG. 14A is an exploded perspective view of a light guide, showing lights emitted from surfaces of the light guide.

The infrared light which has been emitted from the IrDA element 27 is introduced into the light guide 103 through the end face 19 and is propagated in the light guide 3, as shown in FIGS. 13B and 14A. Then, since the emitted infrared light L has the diffusibility to some degree, it is also irradiated on the scattering pattern part 33 on the back surface 17 of the light guide 103.

Figure 14B:
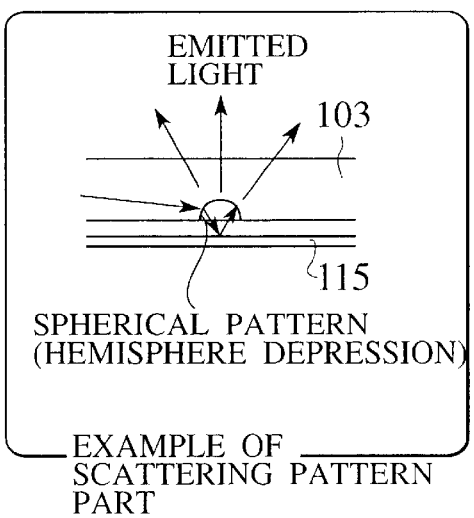
FIG. 14B is an explanatory view showing an example of a scattering pattern part of the light guide.

As shown in FIG. 14B, since the scattering pattern part 33 is provided by spreading generally hemisphere-shaped minute projections over the whole back surface 17 of the light guide 103, the infrared light irradiated on the surface 17 is dispersed in a wide range. Although a part of the infrared light is scattered on the back surface 17 of the light guide 103, the part is reflected by the reflector 115 on the back face 17 and enters into the light guide 3 again.

Further, a part of the infrared light emitted from the IrDA element 27 travels straight in the light guide 103 to reach the opposite end face 21. Thereafter, being reflected by the reflector 115 on the end face 21, the infrared light is again introduced into the light guide 103 and irradiated on the scattering pattern part 33. Similarly, the infrared light reaching the side face of the light guide 103 is also reflected by the reflector 115 and again introduced into the light guide 103 and irradiated on the scattering pattern part 33.

Figure 14C:
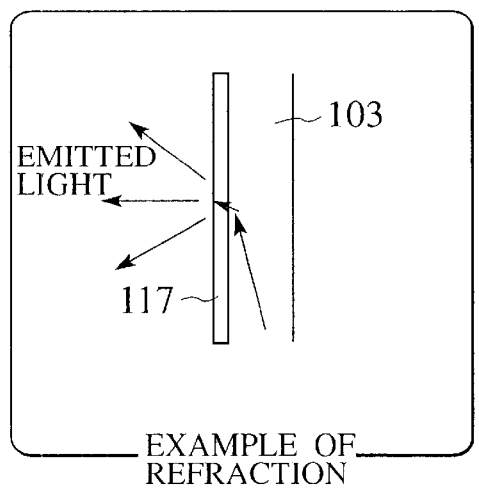
FIG. 14C is an explanatory view showing an example of a refraction process in the light guide.

Furthermore, the infrared light reaching the front face 118 on the other side of the light guide 103 is refracted by the refracting pattern part 117 consisting of a micro-prism, a micro-lens, etc. on the front face 118, as shown in FIG. 14C.

Hereat, referring to FIGS. 15A to 15C, the detailed structure and operation of the refracting pattern part 117 will be described.

The infrared light which has been emitted from the IrDA element 27 is introduced into the light guide 103 through the end face 19 and is transmitted in the light guide 3. Then, since the emitted infrared light has the diffusibility to some degree, the light is partially irradiated on the refracting pattern part 117 on the front face 118.

Figure 15A:
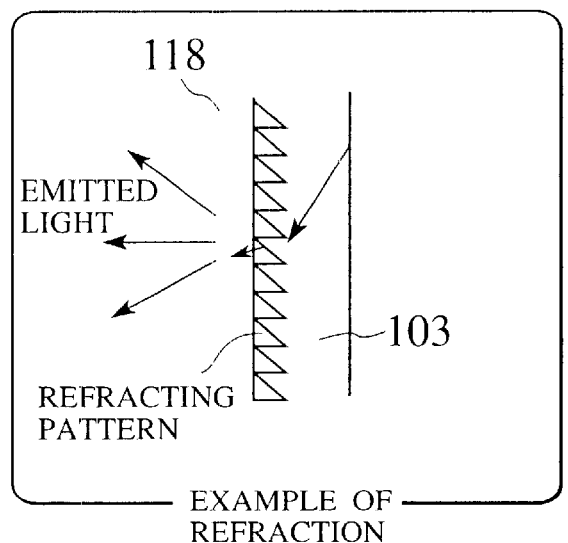
FIGS. 15A, 15B and 15C are views respectively showing examples of the refraction process in the light guide.
Figure 15B:
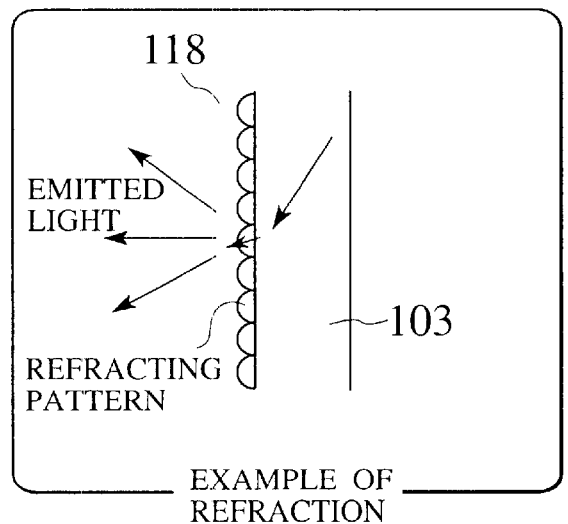
Figure 15C:
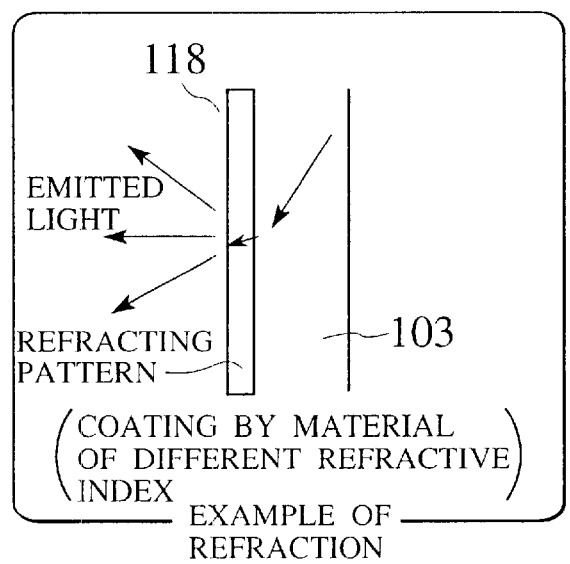

The refracting pattern part 117 may be provided, on the whole end surface of the light guide 103, with either tiny wave-shaped depressions as shown in FIG. 15A or minute lenses as shown in FIG. 15B, so that the infrared light irradiated thereon disperses widely.

Alternatively, the refracting pattern part 117 may be provided with refracting effect resulting from either coating a material different from the light guide 103 or employing a holography technique.

The infrared light emitted from the IrDA element 27 in the above way is generated through the substantial whole of the surfaces 15, 118 of the light guide 103 in the vertical direction, mainly.

Conversely, the infrared light entering from the surface 15 of the light guide 103 is transmitted through the opposite route and received by the receiving part of the IrDA element 27 through the end face 19. While, the infrared light entering through the front face 118 of the light guide 27 is refracted by the refracting pattern part 117 and transmitted through a route opposite to the above-mentioned route. Consequently, this light is generated from the end face having the IrDA element 27 attached thereon and received by the receiving part of the element 27.

Further, the infrared light entering into the light guide 103 through the surface 15 is transmitted in the guide 103 and scattered by the scattering pattern part 33 on the back face 17. Then, the scattered infrared light is partially transmitted toward the front face 118 and generated from the substantial whole of the face 118 mainly in the vertical direction.

Conversely, the infrared light entering into the light guide 103 through the front face 118 is transmitted in the guide 103 through a route opposite to the above-mentioned route and finally generated from the surface 15 of the light guide 103.

The IrDA element 27 in the housing 107 is connected to a hands-free circuit and a connection circuit for the "on-board" information instrument in the telephone holder 101 through the intermediary of the circuit board 29. The hands-free circuit is connected with a speaker, a microphone and so on. The connection circuit is connected with the "on-board" information instrument, such as a navigation system, an on-board PC (personal computer), etc.

On the other hand, when it is detected by the detecting part 109 that the portable telephone 5 is detached off the telephone holder 101, then the connection circuit in the telephone holder 101 is inactivated through a not-shown signal line to stop the transmitting/receiving of the optical signals.

Alternatively in this case, the only transmitting/receiving of optical signals between the IrDA element 27 in the housing 107 and the portable information instrument 111 may be maintained without shutting down the connection circuit in the telephone holder 101 in the modification.

Note, it has been necessary to precisely oppose the infrared optical communication interface on the portable telephone to the IrDA element on the telephone holder's side in the conventional IrDA communication system. On the contrary, according to the embodiment, the infrared optical communication interface 13 on the portable telephone 5 has only to face toward the light guide 103 and therefore, the communication can be established even if roughly positioning between the telephone 5 and the light guide 103.

On the other hand, the portable information instrument 111 is capable of the infrared optical communication with the portable telephone 5 and/or the "on-board" information instruments through the front face 118 of the light guide 103.

In this way, according to the embodiment, owing to the provision of the light guide 103 for changing the optical path of the optical signal between the infrared optical communication interfaces 13 and 113 or between the IrDA element 27 and the interface 113, it is possible to establish the transmitting/receiving of optical signals between the portable telephone 5 and the portable information instrument 111 or between the electronic instruments and the instrument 111 by opposing the interface 113 thereon to the front face 118 of the light guide 103. It means the prevent invention is accompanied with the possibility of "hands-free" call using the portable telephone 5, data communications between the "on-board" information instrument and the portable telephone 5 via the portable telephone cable network, between the instrument 111 and the "on-board" information instrument and between the instrument 111 and the telephone 5, too.

Further, owing to the provision of both refracting pattern part 111 on the front face 118 and scattering pattern part 33 for scattering the optical signals to the interface 13 and the face having no IrDA element, the input or output optical signals from the interface 13 and the IrDA element 27 are scattered through the scattering pattern part 33 and sequentially refracted through the refracting pattern part 117, so that the signals are generated and inputted through the front face 118. Therefore, it is possible to carry out the transmitting/receiving of optical signals between the telephone 5 and the instrument 111 and/or between the electronic instruments and the instrument 111 through the intermediary of the light guide 103.

Again, according to the embodiment, since the arrangement of the reflector 115 on the back face of the scattering pattern part 33 allows the optical signal, which has been scattered by the part 33 and sequentially transmitted up to the back face 117, to be reflected to the light guide 103 again, it is possible to interrupt the noisy light from entering into the light guide 103 without leaking the optical signal out of the back face 117.

Moreover, since the light guide 103 is constructed to make a predetermined inclination angle between the end face 19 having the IrDA element 27 thereon and the front face 118, it is possible to increase the amount of optical signals reaching the front face 118 after being generated from the element 27, whereby the transmitting/receiving of optical signal can be accomplished between the electronic instruments and the portable information instrument 111 effectively.

Additionally, since the light guide 103 is constituted by a material interrupting the transmitting of visible light components, it is possible to reduce the noise due to the external light, maintaining the preferable communication quality.

Moreover, according to the embodiment, since the transmitting/receiving of optical signal between the portable telephone 5 and the IrDA element 27 (or the infrared optical communication interface 113 of the portable information instrument 111) is initiated or stopped corresponding to the detection results oh the portable telephone detecting part 109, it is possible to judge the possibility or impossibility of the infrared optical communication.

[4th. Embodiment]

Figure 18A:
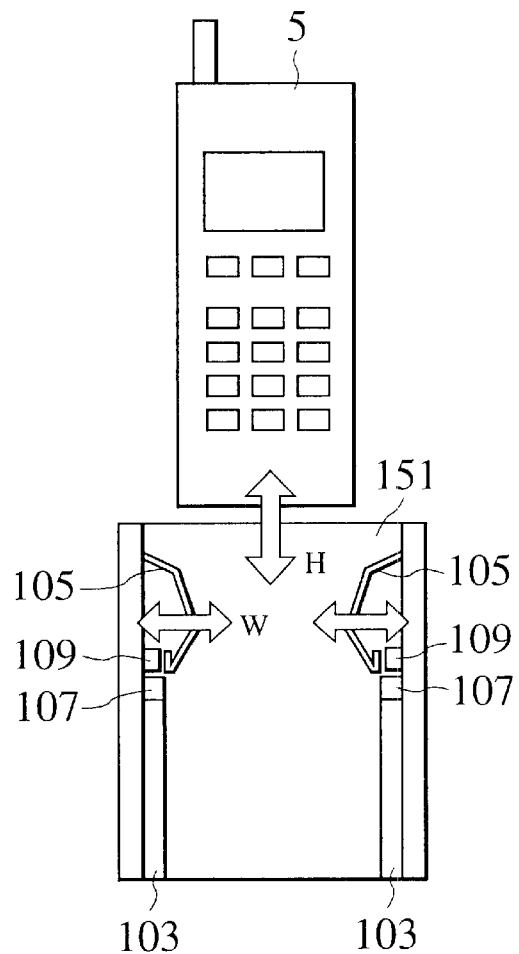
FIG. 18A is a front view of the mobile telephone holding device of a fourth embodiment, showing the state before inserting the portable telephone into the telephone holder.
Figure 18B:
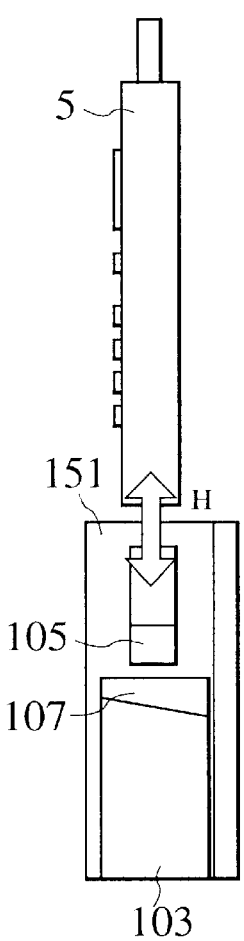
FIG. 18B is a side view of the mobile telephone holding device of the fourth embodiment, showing the state before inserting the portable telephone into the telephone holder.
Figure 19:
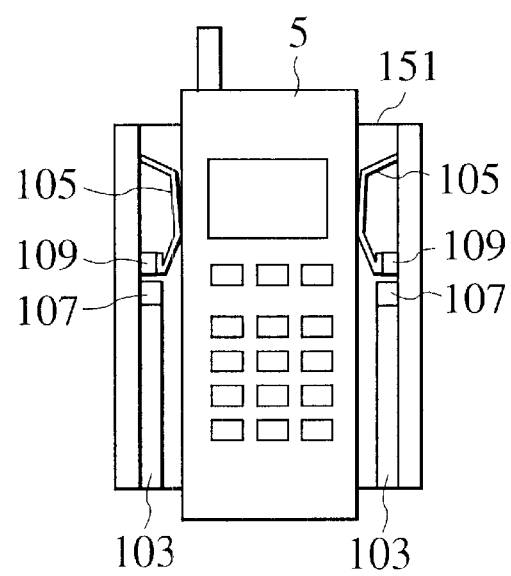
FIG. 19 is a front view of the mobile telephone holding device of the fourth embodiment, showing the state after inserting the portable telephone into the telephone holder.

FIGS. 18A and 18B respectively show a telephone holder 151 applicable to the mobile telephone holding device in accordance with the fourth embodiment of the invention.

The telephone holder 151 is equipped with the light guides 103, the stays 105, the housings 107 and the telephone-detecting parts 109, in respective pairs.

The pairs of light guides 103 and housings 107 are respectively fixed on both inner sides of the recessed telephone holder 101 so that the box-shaped portable telephone 5 is juxtaposed with the pair of light guides 103 at the intermediate position therebetween.

Again, the pair of telephone-detecting parts 109 are also fixed on both inner sides of the recessed telephone holder 101. In this arrangement, when the portable telephone 5 is inserted into the telephone holder 101 from the upside to the downside in the figure, the stays 105 come into touch with the side faces of the portable telephone 5, so that the attachment of the portable telephone 5 can be detected by the telephone-detecting parts 109 in contact with respective free ends of the stays 105.

Note, as the infrared transmitting operation of the light guides 103 of this embodiment is similar to that of the third embodiment, the explanation will be eliminated in this description.

With the structure mentioned above, the infrared optical communication with the telephone holder 151 can be accomplished irrespective of the position of the infrared optical communication interface on either side of the portable telephone 5, whereby the user can put the portable telephone 5 on the holder 151 without worrying about the direction of the portable telephone 5.

The entire contents of Japanese Patent Applications P10-319454 (filed Nov. 10, 1998) and P11-203472 (filed Jul. 16, 1998) are incorporated herein by reference.

Although the invention has been described above by reference to some embodiments of the invention, the invention is not limited to the embodiments described above. Modifications and variations of the embodiments described above will occur to those skilled in the art, in light of the above teachings.

The scope of the invention is defined with reference to the following claims.

What is claimed is:

1. A mobile telephone holding device for detachably holding a portable telephone and transferring optical signals between a first infrared optical communication interface arranged on a surface of the portable telephone and a second infrared optical communication interface connected to electronic instruments, the mobile telephone holding device comprising:

an optical path changing member disposed between a plane containing the surface of the portable telephone having the first infrared optical communication interface thereon and another plane containing the second infrared optical communication interface, the optical path changing member changing a direction of an optical path of the optical signal entering through one of the planes to a direction toward the other plane.

2. The mobile telephone holding device of claim 1, wherein the optical path changing member includes:

a first surface opposing the surface of the portable telephone;

a second surface opposing the plane containing the second infrared optical communication interface; and a third surface opposing the first surface and having a scattering pattern member provided with a plurality of hemispheres for scattering the optical signal entering through one of the planes to the direction toward the other plane.

3. The mobile telephone holding device of claim 2, wherein the optical path changing member is box-shaped and provided, on other surfaces excepting the first to third surfaces, with a reflecting body for reflecting the optical signal or a scattering body for scattering the optical signal.

4. The mobile telephone holding device of claim 2, wherein the optical path changing member is provided, on the first surface, with a bumping member for allowing the optical signal to permeate therethrough and also allowing the optical changing member to come into contact to the portable telephone softly.

5. The mobile telephone holding device of claim 1, further comprising at least one press member for pressing the portable telephone on the optical path changing member so that the portable telephone is pinched between the press member and the optical path changing member.

6. The mobile telephone holding device of claim 1, further comprising a second optical path changing member which is separated from the optical path changing member, wherein the optical path changing member and the second optical path changing member are juxtaposed to each other at a distance so as to pinch the portable telephone therebetween.

7. The mobile telephone holding device of claim 1, further comprising a movable and portable information instrument equipped with a third infrared optical communication interface, wherein the optical path changing member is provided with a fourth surface which changes the optical path of the optical signal between the first infrared optical communication interface and the third infrared optical communication interface or between the second infrared optical communication interface and the third infrared optical communication interface.

8. The mobile telephone holding device of claim 7, wherein the optical path changing member includes:

a refracting pattern member for refracting the optical signal to the fourth surface; and a scattering body for scattering the optical signal toward a surface on which neither the first infrared optical communication interface nor the second infrared optical communication interface is arranged.

9. The mobile telephone holding device of claim 8, wherein the optical path changing member is provided, on a back face of the scattering body, with a reflecting body for reflecting the optical signal.

10. The mobile telephone holding device of claim 7, wherein the optical path changing member is formed so as to make a predetermined inclination angle between its end face provided with the second infrared optical communication interface and the fourth surface.

11. The mobile telephone holding device of claim 7, wherein the optical path changing member is made of material which interrupts the transmitting of visible light components.

12. The mobile telephone holding device of claim 7, further comprising a detecting unit for detecting the portable telephone being held by the mobile telephone holding device, wherein it is executed to initiate or stop the transmitting/receiving of the optical signal between the portable telephone and the second or third infrared optical communication interface corresponding to detection results on the detecting unit.

* * * * *